US010725478B2

(12) United States Patent
 Cobb et al.

(10) Patent No.: US 10,725,478 B2
(45) Date of Patent: Jul. 28, 2020

(54) ROBOTIC-MOUNTED MONUMENT SYSTEM FOR METROLOGY SYSTEMS

(71) Applicant: The Boeing Company, Chicago, IL (US)

(72) Inventors: James M. Cobb, Burien, WA (US); Peter Frederick Trautman, Seattle, WA (US); Paul Frederic Sjoholm, Renton, WA (US)

(73) Assignee: The Boeing Company, Chicago, IL (US)

(*) Notice: Subject to any disclaimer, the term of this patent is extended or adjusted under 35 U.S.C. 154(b) by 41 days.

(21) Appl. No.: 13/933,354

(22) Filed: Jul. 2, 2013

(65) Prior Publication Data
US 2015/0012162 A1   Jan. 8, 2015

(51) Int. Cl.
*G05D 1/02* (2020.01)
*G01B 21/04* (2006.01)

(52) U.S. Cl.
CPC ......... *G05D 1/0291* (2013.01); *G01B 21/047* (2013.01); *G05B 2219/45061* (2013.01); *G05D 2201/0216* (2013.01)

(58) Field of Classification Search
None
See application file for complete search history.

(56) References Cited

U.S. PATENT DOCUMENTS

| 5,363,305 | A | * | 11/1994 | Cox | G01C 21/00 700/253 |
| 6,101,455 | A | * | 8/2000 | Davis | B25J 9/1697 382/153 |
| 9,266,238 | B2 | * | 2/2016 | Huettenhofer | B25J 9/162 |
| 2003/0120377 | A1 | * | 6/2003 | Hooke | B23Q 9/00 700/195 |
| 2003/0208302 | A1 | * | 11/2003 | Lemelson | G05B 19/19 700/245 |
| 2004/0168837 | A1 | * | 9/2004 | Michaud | B25J 5/005 180/9.46 |
| 2006/0271332 | A1 | * | 11/2006 | Loferer | G01B 21/042 702/150 |
| 2008/0033684 | A1 | * | 2/2008 | Vian | F41G 7/303 702/113 |

(Continued)

FOREIGN PATENT DOCUMENTS

| CN | 102880193 | 1/2013 |
| JP | 2005352630 A | 12/2005 |

(Continued)

OTHER PUBLICATIONS

Takeshi Sasaki and Hideki Hashimoto, "Camera Calibration Using Mobile Robot in Intelligent Space", 2006.*

(Continued)

*Primary Examiner* — Jonathan M Dager
*Assistant Examiner* — Garrett F Evans
(74) *Attorney, Agent, or Firm* — Yee & Associates, P.C.

(57) ABSTRACT

A method and apparatus for aligning a number of measurement systems to a reference coordinate system. In one illustrative example, an apparatus may comprise a number of robotic vehicles and a number of monuments associated with the number of robotic vehicles. The number of robotic vehicles may be configured to move into an environment.

29 Claims, 7 Drawing Sheets

(56) References Cited

U.S. PATENT DOCUMENTS

| | | | | | |
|---|---|---|---|---|---|
| 2010/0143089 | A1* | 6/2010 | Hvass | ................... | G05D 1/027 414/754 |
| 2011/0046781 | A1* | 2/2011 | Summer | ................. | B25J 9/162 700/248 |
| 2011/0295427 | A1* | 12/2011 | Motzer | ................... | B25J 9/162 700/258 |
| 2012/0081540 | A1* | 4/2012 | Jang | ......................... | B64F 5/60 348/128 |
| 2013/0017838 | A1* | 1/2013 | Vavrina | ................... | B64G 7/00 455/456.1 |
| 2013/0310982 | A1* | 11/2013 | Scheurer | ............... | B25J 9/1664 700/263 |

FOREIGN PATENT DOCUMENTS

| | | |
|---|---|---|
| JP | 2010540796 A | 12/2010 |
| JP | 2012526995 A | 11/2012 |
| JP | 2013515959 A | 5/2013 |

OTHER PUBLICATIONS

Takeshi Sasaki and Hideki Hashimoto, "Calibration of Laser Range Finders Based on Moving Object Tracking in Intelligent Space", 2009.*

Keith Yu Kit Leung, "Cooperative Localization and Mapping in Sparsely-Communicating Robot Networks", 2012.*

Takeshi Sasaki and Hideki Hashimoto, "Camera Calibration Using Mobile Robot in Intelligent Space", 2006 (Year: 2006).*

Takeshi Sasaki and Hideki Hashimoto, "Calibration of Laser Range Finders Based on Moving Object Tracking in Intelligent Space", (Year: 2009).*

Keith Yu Kit Leung, "Cooperative Localization and Mapping in Sparsely-Communicating Robot Networks", 2012 (Year: 2012).*

"Indoor GPS Technology for Metrology," Arc Second, Inc., White Paper 071502, copyright 2001-2002, 11 pages, accessed Jun. 5, 2013 http://www.cs.columbia.edu/~drexel/CandExam/ARCSecond_Indoor_GPS_Technology_for_Metrology.pdf.

Partial European Search Report, dated Jan. 4, 2016, regarding Application No. EP14175316.0, 6 pages.

Chinese Notification of First Office Action and English translation, dated Nov. 3, 2017, regarding Application No. 201410305122.1, 18 pages.

Canadian Intellectual Property Office Office Action, dated May 2, 2017, regarding Application No. 2,852,519, 13 pages.

Japanese Notice of Reasons for Rejection and English Translation, dated Apr. 24, 2018, regarding Application No. 2014132715, 9 pages.

State Intellectual Property Office of P.R.C. Notification of Second Office Action including Search Report and English Translation, dated Sep. 3, 2018, regarding application No. 201410305122.1, 33 pages.

Leung, "Cooperative Localization and Mapping in Sparsely-Communicating Robot Networks", Doctoral Thesis, University of Toronto, 2012, 12 pages.

Sasaki et al., "Camera Calibration using Mobile Robot in Intelligent Space", SICE-ICASE International Joint Conference 2006, Bexco, Busan, Korea, Oct. 18-21, 2006, pp. 2657-2662.

China National Intellectual Property Administration Notification of Third Office Action with English Translation, dated Apr. 11, 2019, regarding Application No. 201410305122.1, 5 pages.

Canadian Office Action, dated Sep. 3, 2015, regarding CA Application No. 2,852,519, 4 pages.

* cited by examiner

FIG. 6
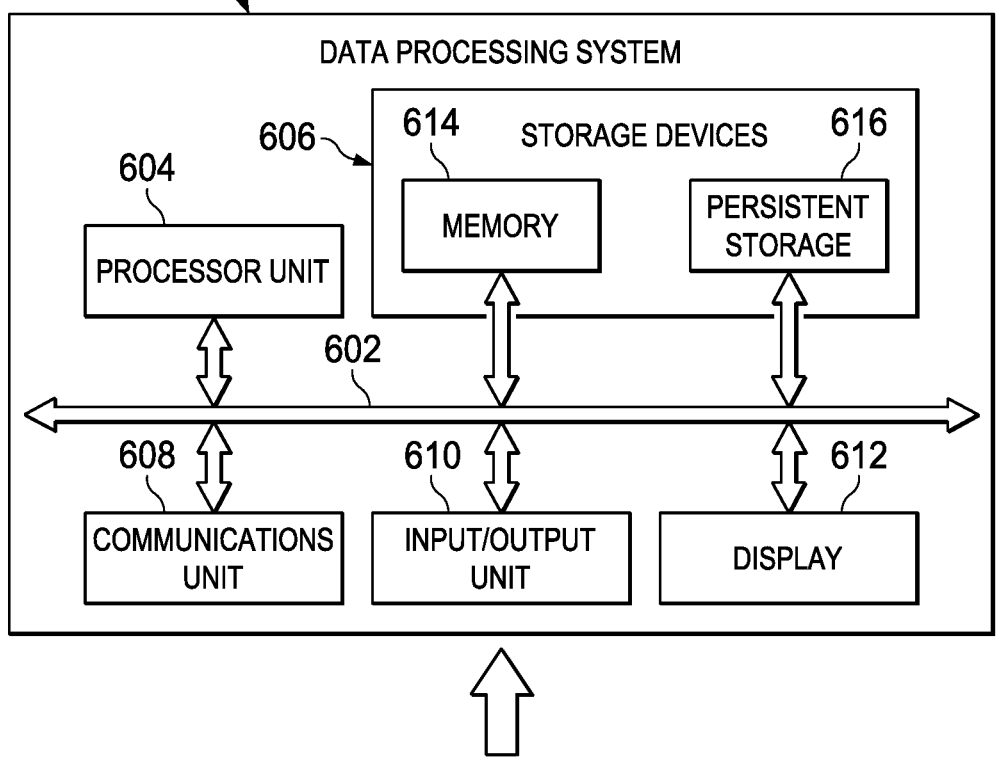
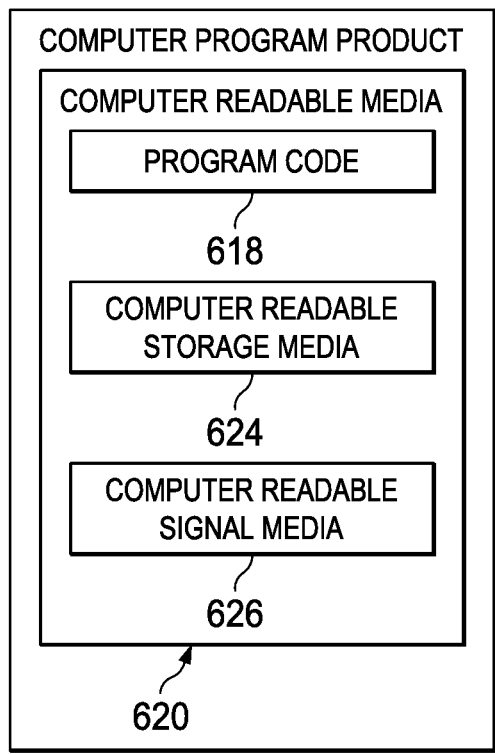

ROBOTIC-MOUNTED MONUMENT SYSTEM FOR METROLOGY SYSTEMS

BACKGROUND INFORMATION

1. Field

The present disclosure relates generally to monuments used by metrology systems and, in particular, to monuments that are mounted on robots. Still more particularly, the present disclosure relates to a method and apparatus for tracking mobile reference points using a robotic-mounted monument system.

2. Background

Monuments may often be used in environments in which metrology systems are used. A metrology system may be any system configured to generate measurements for one or more parameters. Examples of metrology systems may include, but are not limited to, optical measuring systems, motion capture systems, laser tracking systems, imaging systems, radar systems, global positioning systems, thermal imaging systems, and other types of sensor systems.

As used herein, a "monument" for a metrology system may be a rigid structure that may be used as a reference point by the metrology system. A monument used for a metrology system may also be referred to as a metrology monument. Metrology monuments for a metrology system may need to be located such that there is a clear line-of-sight between the metrology monuments and the metrology system.

Typically, metrology monuments may be placed at fixed locations within the area in which the metrology system is to be used. The area may be, for example, without limitation, a manufacturing area, a testing area, an assembly area, or some other type of area. However, in some situations, the locations in which these metrology monuments are placed may limit the clear line of sight between the metrology monuments and the metrology system.

As one illustrative example, a flexible manufacturing environment may use automated guided vehicles (AGV's) to transport large aerospace structures along a factory assembly line. The automated guided vehicles may require that the surfaces on which these vehicles move be substantially flat, smooth, and free of obstructions. Consequently, within this type of environment, the potential locations at which metrology monuments may be placed may be limited to locations on the sides of the work area. These locations may not always provide the clear lines of sight needed between a metrology system and the metrology monuments.

Some currently available metrology monuments may be placed on mobile platforms such as, for example, without limitation, roll carts. These metrology monuments may then be manually rolled out into the work area when needed by a metrology system and manually rolled out of the work area when not needed by the metrology system. In this manner, the metrology system may be stored out of the way until needed.

However, manually moving the metrology monuments in and out of the work area may pose safety concerns for the workers moving the metrology monuments. In particular, work environments such as, for example, without limitation, highly automated factory environments, may present safety issues for workers. Therefore, it would be desirable to have a method and apparatus that take into account at least some of the issues discussed above, as well as other possible issues.

SUMMARY

In one illustrative example, an apparatus may comprise a number of robotic vehicles and a number of monuments associated with the number of robotic vehicles. The number of robotic vehicles may be configured to move into an environment.

In another illustrative embodiment, a monument system for use with a number of measurement systems in a flexible manufacturing environment may comprise a number of monuments, a number of robotic vehicles, and a main controller. Each measurement system in the number of measurement systems in the flexible manufacturing environment may be configured to generate a number of position measurements for the number of monuments for use in aligning the number of measurement systems to a reference coordinate system. A monument in the number of monuments may be selected from one of a sensor device, a number of sensor devices, a target, and a rigid structure. The number of robotic vehicles may be configured to move into an environment. A robotic vehicle in the number of robotic vehicles may comprise a base, a monument structure removably associated with the base, a movement system associated with the base, a sensor system associated with the base, and a control unit associated with the base. The monument structure may be configured to support and hold a set of monuments in the number of monuments. The monument structure may comprise a positioning system configured to at least one of position or orient a monument in the set of monuments relative to the base. The movement system may be configured to move the robotic vehicle. The sensor system may be configured to generate sensor data. The control unit may be configured to receive the sensor data. The control unit may use the sensor data to control the movement system. The main controller may be configured to transform a number of position measurements generated by each of the number of measurement systems to a reference coordinate system to align the number of measurement systems to the reference coordinate system.

In yet another illustrative example, a method for aligning a number of measurement systems to a reference coordinate system may be provided. A number of monuments may be associated with a number of robotic vehicles configured to move within an environment. The number of robotic vehicles may be moved with the number of monuments into the environment for use in aligning the number of measurement systems to the reference coordinate system.

In still yet another illustrative embodiment, a method for aligning a number of measurement systems to a reference coordinate system may be provided. The reference coordinate system may be selected from one of a coordinate system for a measurement system in the number of measurement systems and a coordinate system for an environment. A number of robotic vehicles having a number of monuments associated with the number of robotic vehicles may be moved into a number of optimal positions within a flexible manufacturing environment based on an optimization algorithm configured to identify the number of optimal positions that allow optimal calibration of the number of monuments to be achieved. A number of position measurements generated by each measurement system in the number of measurement systems positioned in the environment may be transformed to the reference coordinate system for use in aligning the number of measurement systems to the reference coordinate system. A monument structure holding a set of monuments in the number of monuments on a robotic vehicle in the number of robotic vehicles may be removed to at least one of add a monument, remove a monument, and replace a monument in the set of monuments. The number of robotic vehicles may be moved out of the environment when the number of measurement systems have completed generating measurements for a number of objects on which operations are being performed within the environment.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 6 is an illustration of a data processing system in the form of a block diagram in accordance with an illustrative embodiment;

DETAILED DESCRIPTION

The illustrative embodiments recognize and take into account different considerations. For example, the illustrative embodiments recognize and take into account that it may be desirable to have an automated system for moving metrology monuments in and out of work areas that does not require human operators. In particular, the illustrative embodiments recognize and take into account that it may be beneficial to mount metrology monuments onto robotic vehicles.

Thus, the illustrative embodiments provide a method and apparatus for using metrology monuments to align measurement systems. In another illustrative example, a method for aligning a number of measurement systems to a reference coordinate system may be provided. A number of robotic vehicles may be moved into an environment. A number of monuments may be associated with the number of robotic vehicles. A number of position measurements generated by each measurement system in the number of measurement systems positioned in the environment may be transformed to the reference coordinate system for use in aligning the number of measurement systems to the reference coordinate system.

Figure 1:
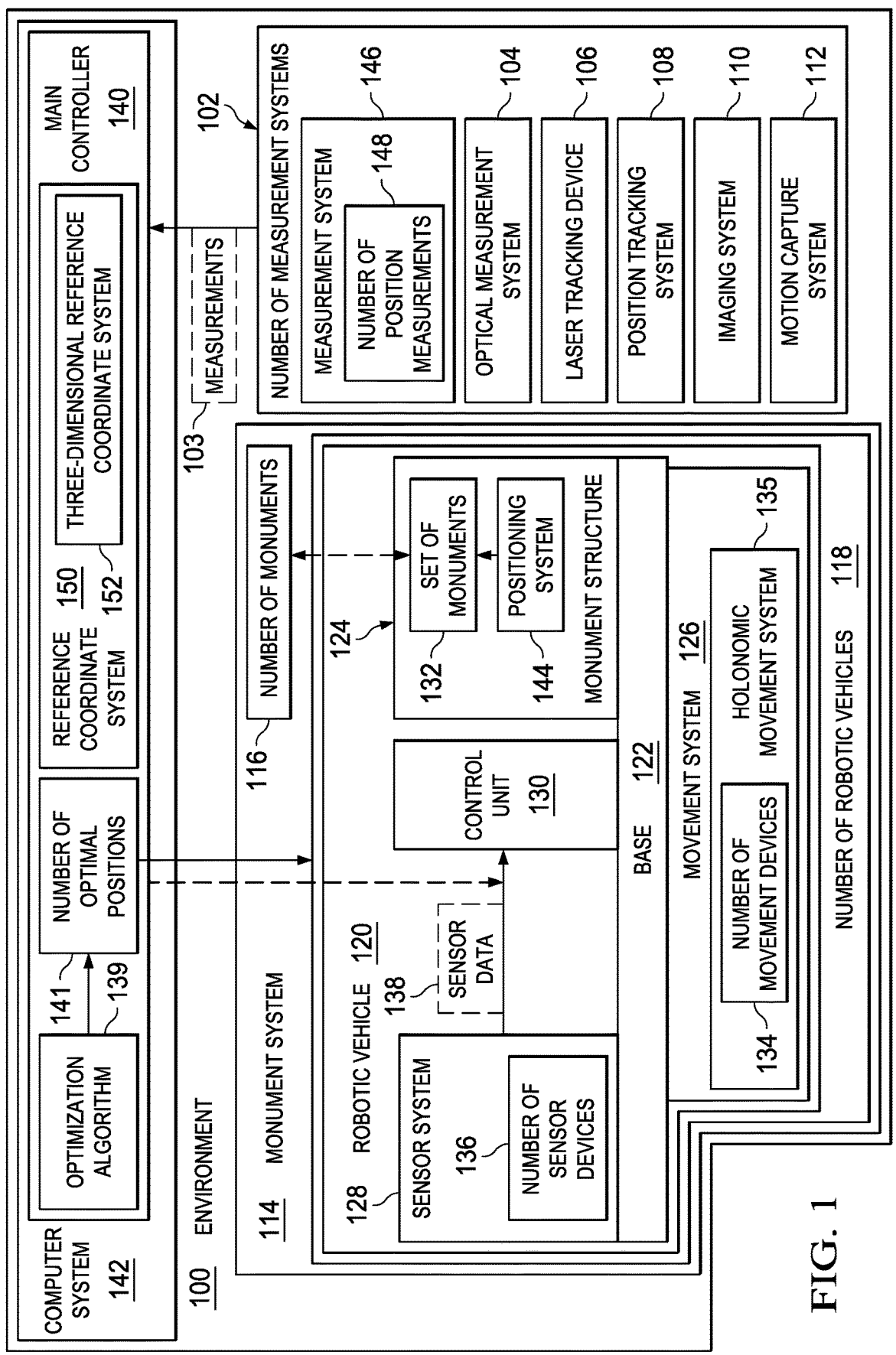
FIG. 1 is an illustration of an environment in which a number of measurement systems are used in the form of a block diagram in accordance with an illustrative embodiment.

Referring now to the figures and, in particular, with reference to FIG. 1, an illustration of an environment in which a number of measurement systems are used is depicted in the form of a block diagram in accordance with an illustrative embodiment. In this illustrative example, environment 100 may be an environment in which number of measurement systems 102 may be used.

As used herein, a "number of" items may be one or more items. In this manner, number of measurement systems 102 may include one or more measurement systems. Number of measurement systems 102 may be configured to generate measurements 103 within environment 100. Measurements 103 may be measurements for a number of objects on which operations are being performed within environment 100. These operations may include, for example, without limitation, testing operations, drilling operations, assembly operations, fabrication operations, inspection operations, imaging operations, rework operations, and/or other types of operations.

Environment 100 may take a number of different forms, depending on the implementation. Environment 100 may take the form of, for example, without limitation, a factory area, a work cell in a flexible manufacturing environment, a manufacturing area, an outdoor environment, an area inside of a building, a laboratory, a testing environment, a section of highway, a region of airspace, a region of space, an underwater environment, a storage area, an airport, or some other type of environment.

In this illustrative example, a measurement system in number of measurement systems 102 may be any type of system or device configured to generate measurements for one or more parameters. In some cases, a measurement system in number of measurement systems 102 may be referred to as a metrology system.

Number of measurement systems 102 may include any number of different types of measurement systems. Number of measurement systems 102 may include at least one of, for example, without limitation, optical measurement system 104, laser tracking device 106, position tracking system 108, imaging system 110, motion capture system 112, or some other type of measurement system or device. In this illustrative example, position tracking system 108 may take the form of one of a global positioning system that uses a satellite network, an optical positioning system, a magnetic positioning system, a large scale tracking system, or some other type of position tracking system.

As used herein, the phrase "at least one of," when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required.

For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Depending on the implementation, a measurement system in number of measurement systems 102 may be configured to be stationary within environment 100 or mobile. For example, without limitation, a measurement system in number of measurement systems 102 may be associated with either a stationary platform or a mobile platform.

In this illustrative example, monument system 114 may be configured for use with number of measurement systems 102. Monument system 114 may be used to provide reference points for measurements 103 generated by number of measurement systems 102.

As depicted, monument system 114 may include number of monuments 116 and number of robotic vehicles 118. As used herein, a "monument," such as one of number of monuments 116, may be any object that may be used to provide a reference point for at least one of number of measurement systems 102. A monument may take the form of a sensor device, a number of sensor devices, a target, a rigid structure, or some other type of object.

Number of monuments 116 may be configured for association with number of robotic vehicles 118. Depending on the implementation, one or more of number of monuments 116 may be mounted on each of number of robotic vehicles 118. As used herein, a "robotic vehicle," such as one of number of robotic vehicles 118, may be any type of mobile platform that may be configured to move either autonomously or semi-autonomously.

Robotic vehicle 120 may be an example of one of number of robotic vehicles 118. In some cases, robotic vehicle 120 may be referred to as a monubot. Robotic vehicle 120 may include base 122, monument structure 124, movement system 126, sensor system 128, and control unit 130.

Base 122 may be, for example, without limitation, the primary structural framework of robotic vehicle 120. Monument structure 124, movement system 126, sensor system 128, and control unit 130 may be configured for association with base 122. Depending on the implementation, one or more of monument structure 124, movement system 126, sensor system 128, and control unit 130 may be removably associated with base 122.

As used herein, when one component is "associated" with another component, the association is a physical association in the depicted examples. For example, a first component, such as monument structure 124, may be considered to be associated with a second component, such as base 122, by being secured to the second component, bonded to the second component, mounted to the second component, welded to the second component, fastened to the second component, and/or connected to the second component in some other suitable manner. The first component also may be connected to the second component using a third component. Further, the first component may be considered to be associated with the second component by being formed as part of and/or as an extension of the second component.

A first component may be removably associated with a second component when the first component is attached to the second component and then removed from the second component. In some cases, the first component may then be reattached to the second component.

In this illustrative example, monument structure 124 may be configured to hold and support set of monuments 132 in number of monuments 116. As used herein, a "set of" items may be one or more items. In this manner, set of monuments 132 may include one or more monuments.

Movement system 126 may be used to move robotic vehicle 120 within environment 100. Movement system 126 may include number of movement devices 134. Number of movement devices 134 may include, for example, without limitation, at least one of a wheel, a holonomic wheel, a roller, a slider, an air bearing, a spherical bearing, or some other type of movement device.

A holonomic wheel may be an omnidirectional wheel. In other words, a holonomic wheel may be configured to move in any direction within about 360 degrees. When number of movement devices 134 includes a number of holonomic wheels, movement system 126 may be referred to as holonomic movement system 135. Holonomic movement system 135 may include other components in addition to number of movement devices 134. For example, without limitation, holonomic movement system 135 may include any number of drive motors, batteries, control units, and/or other components.

In this illustrative example, sensor system 128 may include number of sensor devices 136. Number of sensor devices 136 may include at least one of, for example, without limitation, a navigation sensor, a position tracking device, an imaging sensor, a two-dimensional laser scanner, a three-dimensional laser scanner, or some other type of sensor device. Sensor system 128 may be configured to generate sensor data 138 that may be used to navigate robotic vehicle 120 within environment 100.

Control unit 130 may be implemented using hardware, software, or a combination of the two. In one illustrative example, control unit 130 may be implemented in the form of a processor unit. Of course, in other illustrative examples, control unit 130 may be implemented using at least one of a computer system, a number of computers in communication with each other, a microprocessor, an integrated circuit, an electronic circuit, or some other type of processor.

In some illustrative examples, all of control unit 130 may be implemented on robotic vehicle 120. In other illustrative examples, a portion of control unit 130 may be implemented remotely. For example, without limitation, a portion of control unit 130 may be implemented within a computer in a location remote to robotic vehicle 120.

Control unit 130 may be configured to communicate with sensor system 128. In particular, control unit 130 may be configured to receive sensor data 138 from sensor system 128. In some cases, control unit 130 may also be configured to control sensor system 128.

In this illustrative example, control unit 130 may use sensor data 138 to control the movement of robotic vehicle 120 within environment 100. For example, without limitation, control unit 130 may use sensor data 138 to control movement system 126. In particular, control unit 130 may control number of movement devices 134 to move robotic vehicle 120 within environment 100.

Each robotic vehicle in number of robotic vehicles 118 may be implemented in a manner similar to robotic vehicle 120. In this manner, each of number of robotic vehicles 118 may be configured to have a base, a monument structure, a movement system, a sensor system, and a control unit similar to base 122, monument structure 124, movement system 126, sensor system 128, and control unit 130, respectively.

In some illustrative examples, the control unit on each robotic vehicle in number of robotic vehicles 118 may be configured to communicate with the other control units on the other robotic vehicles in number of robotic vehicles 118. In this manner, these control units may be able to coordinate the movement of number of robotic vehicles 118 within environment 100. In particular, these control units may be able to coordinate the movement of number of robotic vehicles 118 within environment 100.

In other illustrative examples, the control unit on each robotic vehicle in number of robotic vehicles 118 may be configured to operate independently of the other control units. For example, control unit 130 on robotic vehicle 120 may use sensor data 138 obtained from sensor system 128 to track the positions of other robotic vehicles in number of robotic vehicles 118 within environment 100.

Further, in some cases, the control unit on each robotic vehicle in number of robotic vehicles 118 may be configured to communicate with main controller 140. Number of robotic vehicles 118 may communicate with main controller 140 wirelessly in these examples. Main controller 140 may be a primary controller within environment 100. Main controller 140 may be configured to control operations performed within environment 100.

Main controller 140 may be configured to communicate with and/or control number of measurement systems 102. In some cases, main controller 140 may be configured to communicate and/or control number of robotic vehicles 118.

Depending on the implementation, main controller 140 may be implemented using hardware, software, or a combination of the two. In one illustrative example, main controller 140 may be implemented using computer system 142. Computer system 142 may be comprised of one or more computers. When more than one computer is present in computer system 142, these computers may be in communication with each other.

In this illustrative example, prior to number of measurement systems 102 being used to generate measurements 103 within environment 100, number of robotic vehicles 118 carrying number of monuments 116 may be moved into environment 100. Each of number of robotic vehicles 118 may be moved into a position within environment 100 that allows for optimal calibration of the set of monuments mounted on the monument structure of each of number of robotic vehicles 118. In particular, the control unit on each of number of robotic vehicles 118 may use optimization algorithm 139 to identify number of optimal positions 141 that may provide optimal calibration of the set of monuments mounted on the robotic vehicle.

Optimal calibration of the set of monuments mounted on the robotic vehicle may be achieved when a number of selected factors are taken into account. Optimization algorithm 139 may be configured to take these selected factors into account. One factor may be the actual number of robotic vehicles in number of robotic vehicles 118 that are needed. Another factor may be the largest common floor area that is within the working range of all of number of measurement systems 102. In other words, the largest common area within which all of number of measurement systems 102 may move and/or perform operations may be taken into account.

Yet another factor may be that the position of each robotic vehicle in number of robotic vehicles 118 may need to allow the robotic vehicle to be spatially oriented such that any measurement system in number of measurement systems 102 that includes one or more direction-dependent sensors may need to be able to point at the robotic vehicle. Of course, depending on the implementation, other factors may be taken into account in identifying number of optimal positions 141. In one illustrative example, optimization algorithm 139 may take the form of a global cost function optimization that uses a least-squares minimization.

Of course, in some illustrative examples, main controller 140 may be configured to control the movement of each of number of robotic vehicles 118. Main controller 140 may be configured to wirelessly send commands to number of robotic vehicles 118. For example, without limitation, main controller 140 may be configured to wirelessly receive sensor data 138 from sensor system 128 and/or control unit 130 onboard robotic vehicle 120. Main controller 140 may use sensor data 138 along with the sensor data received from the other robotic vehicles in number of robotic vehicles 118 to guide number of robotic vehicles 118 to the optimal positions within environment 100.

In some illustrative examples, once each of number of robotic vehicles 118 has been moved to the optimal position, the monument structure on each robotic vehicle may be used to control the position and/or orientation of each monument mounted on the robotic vehicle. For example, without limitation, monument structure 124 may have positioning system 144 configured to adjust the position and/or orientation of each monument in set of monuments 132 relative to monument structure 124.

Thereafter, each measurement system in number of measurement systems 102 may be configured to measure the position of each monument in number of monuments 116 with respect to a coordinate system for that measurement system.

Measurement system 146 may be an example of one of number of measurement systems 102. Measurement system 146 may be configured to generate number of position measurements 148 and send number of position measurements 148 to main controller 140. Number of position measurements 148 may include a position measurement for each of number of monuments 116.

Main controller 140 may be configured to transform number of position measurements 148 to reference coordinate system 150. Further, main controller 140 may be configured to transform the position measurements generated by each of number of measurement systems 102 to reference coordinate system 150.

In one illustrative example, reference coordinate system 150 may be three-dimensional reference coordinate system 152. In some cases, reference coordinate system 150 may be selected as the coordinate system used by a particular measurement in number of measurement systems 102. In other illustrative examples, reference coordinate system 150 may be a coordinate system for environment 100. In still other examples, reference coordinate system 150 may be the coordinate system for an object on which one or more operations are being performed in environment 100.

Main controller 140 may transform number of position measurements 148 to reference coordinate system 150 using, for example, without limitation, currently available mathematical formulas and/or techniques. In this manner, all measurements generated by measurement system 146 may then be transformed to reference coordinate system 150. Thus, measurement system 146 may be considered aligned with respect to reference coordinate system 150. Main controller 140 may be configured to align each of number of measurement systems 102 with reference coordinate system 150 using number of monuments 116.

Once number of measurement systems 102 has been aligned to reference coordinate system 150, measurements 103 may then be generated for the number of objects on which operations are being performed in environment 100. Further, number of robotic vehicles 118 may then be moved out of environment 100 or at least out of the way of number of measurement systems 102 and/or other tools or machines in environment 100. Number of robotic vehicles 118 may be moved away before or after measurements 103 are generated, depending on the implementation.

In some cases, one or more of number of robotic vehicles 118 may be moved back into environment 100 to ensure that number of measurement systems 102 are still properly aligned with reference coordinate system 150. In this manner, number of robotic vehicles 118 may be moved into a work area in environment 100 when needed and stored out of the way when not needed.

Further, when the operations being performed on a particular object in environment 100 have been completed, the object may be moved out of environment 100. A different object may then be brought into environment 100. In some cases, the particular monuments included in number of monuments 116 may be changed. For example, at least one monument may be added to number of monuments 116, removed from number of monuments 116, or replaced in number of monuments 116.

The illustration of environment 100 in FIG. 1 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

Figure 2:
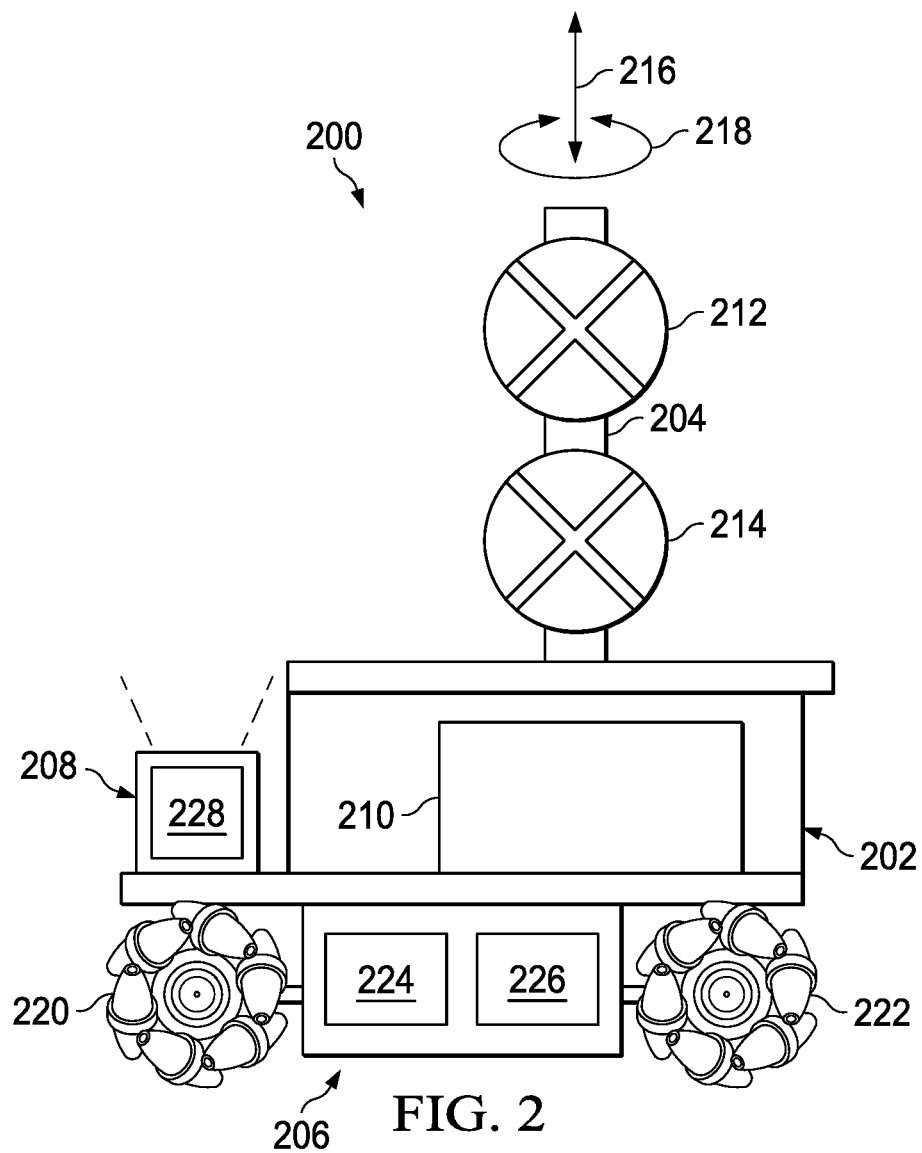
FIG. 2 is an illustration of a robotic vehicle in accordance with an illustrative embodiment.

With reference now to FIG. 2, an illustration of a robotic vehicle is depicted in accordance with an illustrative embodiment. In this illustrative example, robotic vehicle 200 may be an example of one implementation for robotic vehicle 120 in FIG. 1.

As depicted, robotic vehicle 200 may include base 202, monument structure 204, movement system 206, sensor system 208, and control unit 210. Base 202, monument structure 204, movement system 206, sensor system 208, and control unit 210 may be examples of implementations for base 122, monument structure 124, movement system 126, sensor system 128, and control unit 130, respectively, in FIG. 1. In this illustrative example, monument structure 204, movement system 206, sensor system 208, and control unit 210 may be attached to base 202. Further, monument structure 204 may be removably attached to base 202.

In this illustrative example, monument 212 and monument 214 may be attached to monument structure 204. Monument 212 and monument 214 may be an example of one implementation for set of monuments 132 in FIG. 1. Monument structure 204 may have a positioning system (not shown) that may allow monument 212 and monument 214 to be repositioned and/or reoriented relative to base 202.

For example, without limitation, monument structure 204 may be configured to move monument 212 and/or monument 214 in a direction substantially parallel to axis 216 to reposition these monuments. Further, in some cases, monument structure 204 may be configured to rotate monument 212 and/or monument 214 about axis 216 in a direction along arrow 218 to reorient these monuments.

As depicted, movement system 206 may include holonomic wheel 220, holonomic wheel 222, motor 224, and battery 226. Holonomic wheel 220 and holonomic wheel 222 may be an example of one implementation for number of movement devices 134 in FIG. 1.

In this illustrative example, sensor system 208 may include laser scanner 228. Laser scanner 228 may be an example of one implementation for number of sensor devices 136 in FIG. 1. In this illustrative example, laser scanner 228 may be a two-dimensional laser scanner. Laser scanner 228 may generate sensor data and then send this sensor data to control unit 210. Control unit 210 may be configured to use this sensor data to control the movement of robotic vehicle 200. For example, without limitation, control unit 210 may send commands to movement system 206 based on the sensor data.

Figure 3:
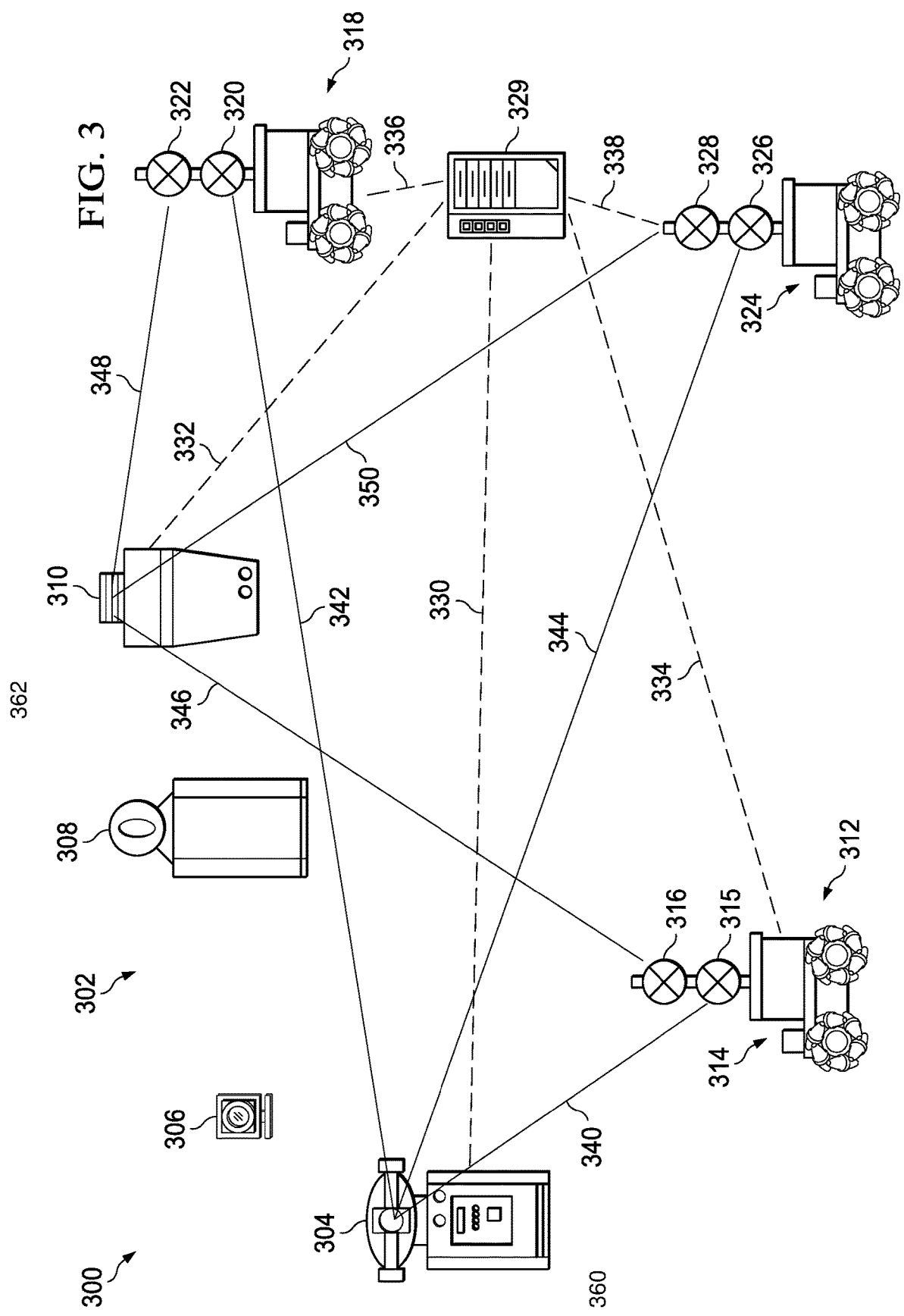
FIG. 3 is an illustration of an environment in which a number of measurement systems are used to generate measurements in accordance with an illustrative embodiment.

With reference now to FIG. 3, an illustration of an environment in which a number of measurement systems are used to generate measurements is depicted in accordance with an illustrative embodiment. In this illustrative example, environment 300 may be an example of one implementation for environment 100 in FIG. 1.

As depicted, number of measurement systems 302 may be present within environment 300. Number of measurement systems 302 may be an example of one implementation for number of measurement systems 102 in FIG. 1. Number of measurement systems 302 may include laser tracking system 304, motion capture system 306, laser radar system 308, and position tracking system 310.

Further, monument system 312 may also be present within environment 300. Monument system 312 may include robotic vehicle 314 holding monument 315 and monument 316, robotic vehicle 318 holding monument 320 and monument 322, and robotic vehicle 324 holding monument 326 and monument 328. Robotic vehicles 314, 318, and 324 may be an example of one implementation for number of robotic vehicles 118 in FIG. 1. Further, monuments 315, 316, 320, 322, 326, and 328 may be an example of one implementation for number of monuments 116 in FIG. 1.

As depicted, main controller 329 may also be present within environment 300. In this illustrative example, only laser tracking system 304 and position tracking system 310 may be currently activated for use. Laser tracking system 304 may be configured to communicate with main controller 329 over wireless communications link 330. Position tracking system 310 may be configured to communicate with main controller 329 over wireless communications link 332. Further, robotic vehicles 314, 318, and 324 may be configured to communicate with main controller 329 over wireless communications links 334, 336, and 338, respectively.

In this illustrative example, robotic vehicles 314, 318, and 324 may be configured to position themselves within environment 300 such that monuments 315, 316, 320, 322, 326, and 328 may be optimally calibrated. Once robotic vehicles 314, 318, and 324 have been positioned optimally, each of laser tracking system 304 and position tracking system 310 may generate a position measurement for each of robotic vehicles 314, 318, and 324.

In particular, laser tracking system 304 may generate a position measurement for each of robotic vehicles 314, 318, and 324, as indicated by lines 340, 342, and 344, respectively. Further, position tracking system 310 may generate a position measurement for each of robotic vehicles 314, 318, and 324, as indicated by lines 346, 348, and 350, respectively. These position measurements may all be sent to main controller 329 for processing.

Main controller 329 may be configured to transform these position measurements to a reference coordinate system (not shown), similar to reference coordinate system 150 in FIG. 1. In this manner, main controller 329 may align laser tracking system 304 and position tracking system 310 to the reference coordinate system (not shown) such that all measurements generated by these measurement systems may be generated relative to the reference coordinate system (not shown).

As one illustrative example, laser tracking system 304 may be used to measure the position of an assembly 360 within environment 300. Position tracking system 310 may be used to measure the position of a part 362 that is to be placed on this assembly 360 within environment 300. Main controller 329 may identify the transformation needed to transform the position measurements of laser tracking system 304 and of position tracking system 310 to the reference coordinate system (not shown) such that these systems are mathematically aligned with respect to the reference coordinate system (not shown). For example, without limitation, the movement command required to place the part 362 on the assembly 360 may be calculated using the transformation identified by main controller 329. The movement command may then be used to, for example, without limitation, command a robot (not shown) located within environment 300 to place the part 362 on the assembly 360.

The illustrations of robotic vehicle 200 in FIG. 2 and environment 300 in FIG. 3 are not meant to imply physical or architectural limitations to the manner in which an illustrative embodiment may be implemented. Other components in addition to or in place of the ones illustrated may be used. Some components may be optional.

The different components shown in FIGS. 2-3 may be illustrative examples of how components shown in block form in FIG. 1 can be implemented as physical structures. Additionally, some of the components in FIGS. 2-3 may be combined with components in FIG. 1, used with components in FIG. 1, or a combination of the two.

Figure 4:
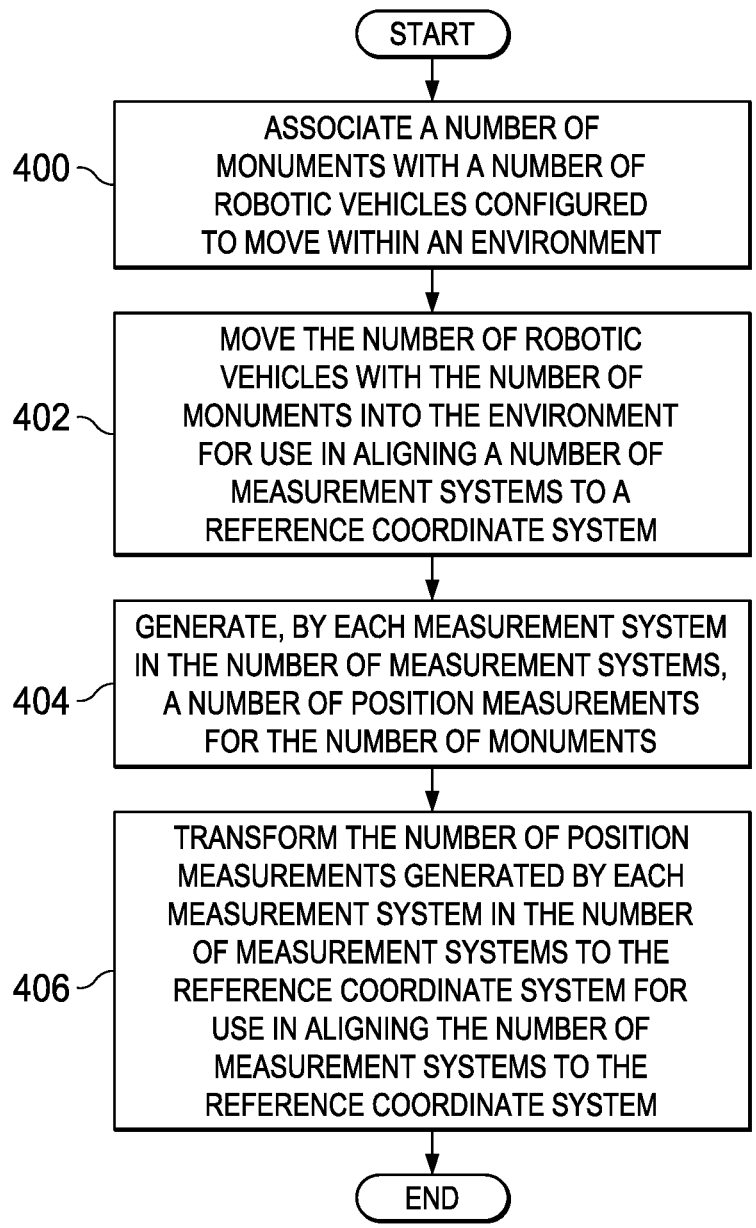
FIG. 4 is an illustration of a process for aligning a number of measurement systems to a reference coordinate system in the form of a flowchart in accordance with an illustrative embodiment.

With reference now to FIG. 4, an illustration of a process for aligning a number of measurement systems to a reference coordinate system is depicted in the form of a flowchart in accordance with an illustrative embodiment. The process illustrated in FIG. 4 may be implemented to align number of measurement systems 102 to reference coordinate system 150 in FIG. 1.

The process may begin by associating number of monuments 116 with number of robotic vehicles 118 configured to move within environment 100 (operation 400). Operation 400 may be performed by, for example, without limitation, mounting a set of monuments, such as set of monuments 132, to a monument structure on a robotic vehicle, such as monument structure 124 on robotic vehicle 120.

Thereafter, number of robotic vehicles 118 with number of monuments 116 may be moved into environment 100 for use in aligning number of measurement systems 102 to reference coordinate system 150 (operation 402). Next, number of position measurements 148 for number of monuments 116 may be generated by each measurement system in number of measurement systems 102 (operation 404).

Number of position measurements 148 generated by each measurement system in number of measurement systems 102 may then be transformed to reference coordinate system 150 for use in aligning number of measurement systems 102 to reference coordinate system 150 (operation 406), with the process terminating thereafter. Once operation 406 has been performed, all measurements 103 generated by number of measurement systems 102 may be processed with respect to the same coordinate system, such as reference coordinate system 150.

Further, each of number of measurement systems 102 may be moved and controlled within environment 100 using commands generated based on reference coordinate system 150. Using reference coordinate system 150 allows improved management of number of measurement systems 102 and may increase the speed and efficiency with which measurements 103 may be processed.

Figure 5:
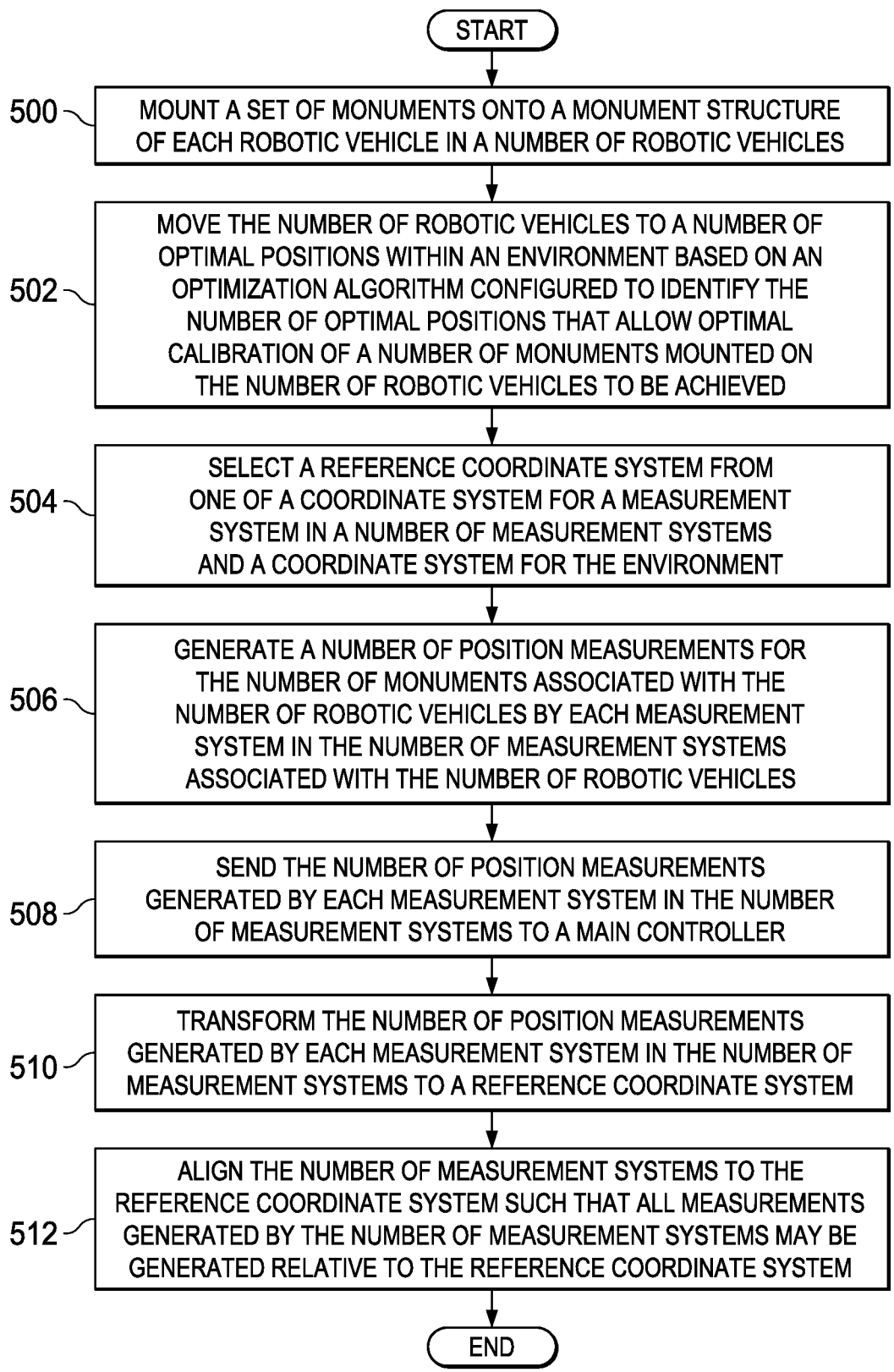
FIG. 5 is an illustration of a process for aligning a number of measurement systems to a reference coordinate system in the form of a flowchart in accordance with an illustrative embodiment.

With reference now to FIG. 5, an illustration of a process for aligning a number of measurement systems to a reference coordinate system is depicted in the form of a flowchart in accordance with an illustrative embodiment. The process illustrated in FIG. 5 may be implemented to align number of measurement systems 102 to reference coordinate system 150 in FIG. 1.

The process may begin by mounting set of monuments 132 onto monument structure 124 of each robotic vehicle in number of robotic vehicles 118 (operation 500). Next, number of robotic vehicles 118 may be moved to a number of optimal positions within environment 100 based on an optimization algorithm configured to identify the number of optimal positions that allow optimal calibration of number of monuments 116 mounted on number of robotic vehicles 118 to be achieved (operation 502).

Thereafter, reference coordinate system 150 may be selected from one of a coordinate system for measurement system 146 in number of measurement systems 102 and a coordinate system for environment 100 (operation 504). Number of position measurements 148 for number of monuments 116 associated with number of robotic vehicles 118 may be generated by each measurement system in number of measurement systems 102 associated with number of robotic vehicles 118 (operation 506).

Number of position measurements 148 generated by each measurement system in number of measurement systems 102 may then be sent to main controller 140 (operation 508). Main controller 140 may then transform number of position measurements 148 generated by each measurement system in number of measurement systems 102 to reference coordinate system 150 (operation 510). Thereafter, main controller 140 may align number of measurement systems 102 to reference coordinate system 150 such that all measurements 103 generated by number of measurement systems 102 may be generated relative to reference coordinate system 150 (operation 512), with the process terminating thereafter.

Turning now to FIG. 6, an illustration of a data processing system in the form of a block diagram is depicted in accordance with an illustrative embodiment. Data processing system 600 may be used to implement main controller 140, one or more computers in computer system 142, control unit 130, and/or the control unit for a robotic vehicle in number of robotic vehicles 118 in FIG. 1. As depicted, data processing system 600 includes communications framework 602, which provides communications between processor unit 604, storage devices 606, communications unit 608, input/output unit 610, and display 612. In some cases, communications framework 602 may be implemented as a bus system.

Processor unit 604 is configured to execute instructions for software to perform a number of operations. Processor unit 604 may comprise a number of processors, a multi-processor core, and/or some other type of processor, depending on the implementation. In some cases, processor unit 604 may take the form of a hardware unit, such as a circuit system, an application specific integrated circuit (ASIC), a programmable logic device, or some other suitable type of hardware unit.

Instructions for the operating system, applications, and/or programs run by processor unit 604 may be located in storage devices 606. Storage devices 606 may be in communication with processor unit 604 through communications framework 602. As used herein, a storage device, also referred to as a computer readable storage device, is any piece of hardware capable of storing information on a temporary and/or permanent basis. This information may include, but is not limited to, data, program code, and/or other information.

Memory 614 and persistent storage 616 are examples of storage devices 606. Memory 614 may take the form of, for example, a random access memory or some type of volatile or non-volatile storage device. Persistent storage 616 may comprise any number of components or devices. For example, persistent storage 616 may comprise a hard drive, a flash memory, a rewritable optical disk, a rewritable magnetic tape, or some combination of the above. The media used by persistent storage 616 may or may not be removable.

Communications unit 608 allows data processing system 600 to communicate with other data processing systems and/or devices. Communications unit 608 may provide communications using physical and/or wireless communications links.

Input/output unit 610 allows input to be received from and output to be sent to other devices connected to data processing system 600. For example, input/output unit 610 may allow user input to be received through a keyboard, a mouse, and/or some other type of input device. As another example, input/output unit 610 may allow output to be sent to a printer connected to data processing system 600.

Display 612 is configured to display information to a user. Display 612 may comprise, for example, without limitation, a monitor, a touch screen, a laser display, a holographic display, a virtual display device, and/or some other type of display device.

In this illustrative example, the processes of the different illustrative embodiments may be performed by processor unit 604 using computer-implemented instructions. These instructions may be referred to as program code, computer usable program code, or computer readable program code and may be read and executed by one or more processors in processor unit 604.

In these examples, program code 618 is located in a functional form on computer readable media 620, which is selectively removable, and may be loaded onto or transferred to data processing system 600 for execution by processor unit 604. Program code 618 and computer readable media 620 together form computer program product 622. In this illustrative example, computer readable media 620 may be computer readable storage media 624 or computer readable signal media 626.

Computer readable storage media 624 is a physical or tangible storage device used to store program code 618 rather than a medium that propagates or transmits program code 618. Computer readable storage media 624 may be, for example, without limitation, an optical or magnetic disk or a persistent storage device that is connected to data processing system 600.

Alternatively, program code 618 may be transferred to data processing system 600 using computer readable signal media 626. Computer readable signal media 626 may be, for example, a propagated data signal containing program code 618. This data signal may be an electromagnetic signal, an optical signal, and/or some other type of signal that can be transmitted over physical and/or wireless communications links.

The illustration of data processing system 600 in FIG. 6 is not meant to provide architectural limitations to the manner in which the illustrative embodiments may be implemented. The different illustrative embodiments may be implemented in a data processing system that includes components in addition to or in place of those illustrated for data processing system 600. Further, components shown in FIG. 6 may be varied from the illustrative examples shown.

Figure 7:
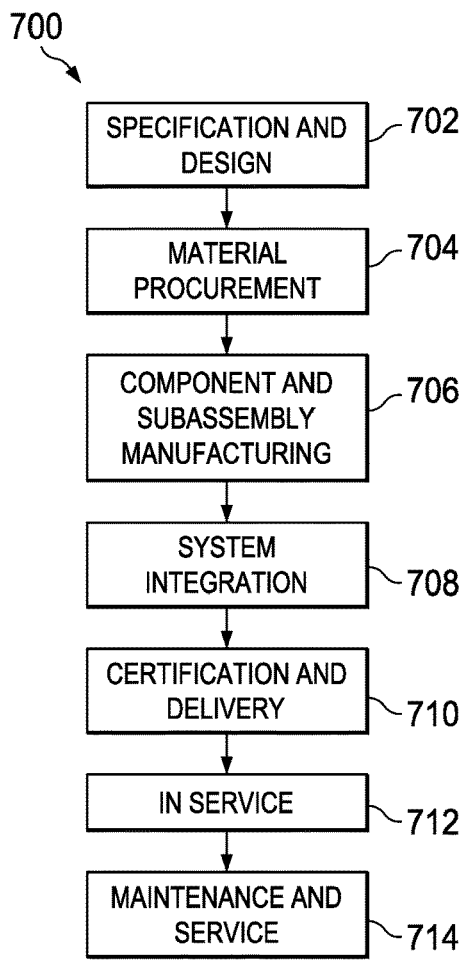
FIG. 7 is an illustration of an aircraft manufacturing and service method in the form of a block diagram in accordance with an illustrative embodiment.
Figure 8:
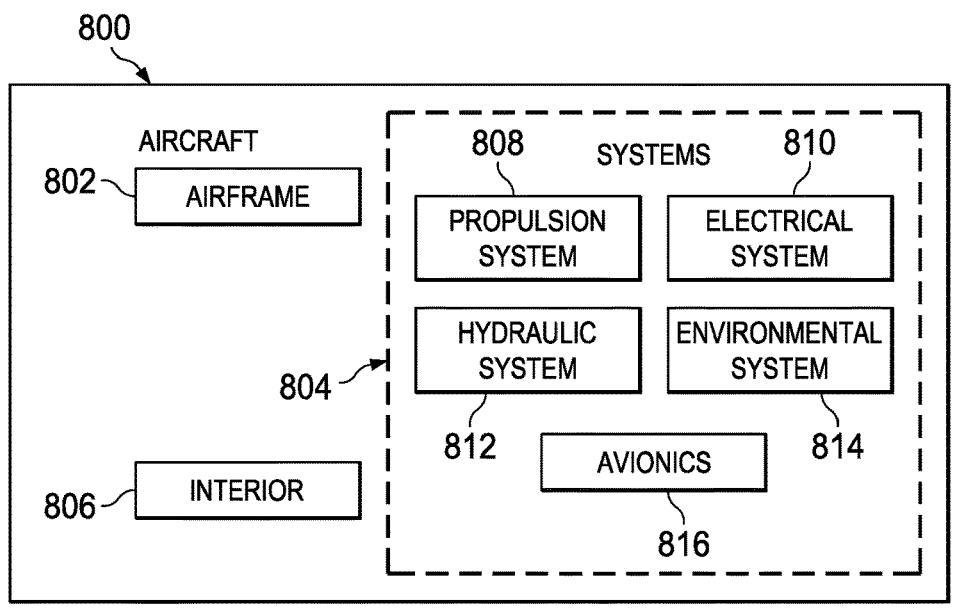
FIG. 8 is an illustration of an aircraft in the form of a block diagram in which an illustrative embodiment may be implemented.

Illustrative embodiments of the disclosure may be described in the context of aircraft manufacturing and service method 700 as shown in FIG. 7 and aircraft 800 as shown in FIG. 8. Turning first to FIG. 7, an illustration of an aircraft manufacturing and service method is depicted in the form of a block diagram in accordance with an illustrative embodiment. During pre-production, aircraft manufacturing and service method 700 may include specification and design 702 of aircraft 800 in FIG. 8 and material procurement 704.

During production, component and subassembly manufacturing 706 and system integration 708 of aircraft 800 in FIG. 8 takes place. Thereafter, aircraft 800 in FIG. 8 may go through certification and delivery 710 in order to be placed in service 712. While in service 712 by a customer, aircraft 800 in FIG. 8 is scheduled for routine maintenance and service 714, which may include modification, reconfiguration, refurbishment, and other maintenance or service.

Each of the processes of aircraft manufacturing and service method 700 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 8, an illustration of an aircraft is depicted in the form of a block diagram in which an illustrative embodiment may be implemented. In this example, aircraft 800 is produced by aircraft manufacturing and service method 700 in FIG. 7 and may include airframe 802 with plurality of systems 804 and interior 806. Examples of systems 804 include one or more of propulsion system 808, electrical system 810, hydraulic system 812, and environmental system 814. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 700 in FIG. 7. In particular, monument system 114 from FIG. 1 may be used for aligning measurement systems during any one of the stages of aircraft manufacturing and service method 700. For example, without limitation, monument system 114 from FIG. 1 may be used during at least one of component and subassembly manufacturing 706, system integration 708, routine maintenance and service 714, or some other stage of aircraft manufacturing and service method 700.

In one illustrative example, components or subassemblies produced in component and subassembly manufacturing 706 in FIG. 7 may be fabricated or manufactured in a manner similar to components or subassemblies produced while aircraft 800 is in service 712 in FIG. 7. As yet another example, one or more apparatus embodiments, method embodiments, or a combination thereof may be utilized during production stages, such as component and subassembly manufacturing 706 and system integration 708 in FIG. 7. One or more apparatus embodiments, method embodiments, or a combination thereof may be utilized while aircraft 800 is in service 712 and/or during maintenance and service 714 in FIG. 7. The use of a number of the different illustrative embodiments may substantially expedite the assembly of and/or reduce the cost of aircraft 800.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A system comprising:
   a plurality of robotic vehicles, wherein each robotic vehicle comprises a monument situated on a monument structure and is configured to move to a specific respective position within an environment that allows for calibration of the monument, wherein each robotic vehicle has a monument situated on a monument structure, wherein each robotic vehicle has a sensor configured to generate sensor data used to determine when the robotic vehicle is at the position corresponding to the robotic vehicle, and wherein each robotic vehicle comprises a control unit configured to use the sensor data to track positions of other robotic vehicles in the plurality of robotic vehicles and to coordinate movement of the robotic vehicle with movement of the other robotic vehicles within the environment according to an optimization algorithm comprising a global cost function using least-square minimization according to: the number of robotic vehicles, a largest area in the environment within working range of the measurement system, and spatial orientation of the robotic vehicles to enable the direction-dependent sensors to point at the robotic vehicles;
   a measurement system in the environment, the measurement system being configured to interact with the monument of each of the robotic vehicles after each robotic vehicle has been positioned at its respective position to generate a plurality of position measurements based on reference points provided by the monuments of the robotic vehicles within the environment; and
   a main controller configured to align the measurement system to a reference coordinate system based on the plurality of position measurements of the reference points, after which measurements can be generated by the measurement system for objects within the environments without need of the robotic vehicles.

2. The system of claim 1, wherein the plurality of position measurements are used to align the measurement system to the reference coordinate system such that further position measurements generated by the measurement system are processed according to the reference coordinate system.

3. The system of claim 1, wherein the reference coordinate system is selected from one of a coordinate system for the measurement system and a coordinate system for the environment.

4. The system of claim 1, wherein each robotic vehicle in the plurality of robotic vehicles comprises:
   a base; and
   the monument structure removably fixed to the base, wherein the monument structure is configured to support and hold a set of monuments.

5. The system of claim 4, wherein the monument structure comprises:
   a positioning system configured to at least one of move a monument in the set of monuments in a direction toward or away from the base or rotate a monument in the set of monuments relative to the base.

6. The system of claim 5, wherein each robotic vehicle further comprises:
   a movement system associated with the base and configured to move the robotic vehicle;
   a sensor system comprising the sensor, wherein the sensor system is associated with the base and configured to generate the sensor data; and
   the control unit associated with the base and configured to receive the sensor data, wherein the control unit uses the sensor data to control the movement system.

7. The system of claim 6, wherein the movement system is a holonomic movement system.

8. The system of claim 1, wherein the monument is selected from one or more of a sensor device, a number of sensor devices, a target, and a rigid structure.

9. The system of claim 1, wherein the plurality of robotic vehicles forms a monument system.

10. The system of claim 1, wherein the environment is a manufacturing environment.

11. The system of claim 1, wherein the measurement system comprises at least one of an optical measurement system, a laser tracking device, a position tracking system, an imaging system, and a motion capture system.

12. The system of claim 2, wherein:
    the main controller is configured to transform the plurality of position measurements generated by the measurement system to the reference coordinate system to align the measurement system to the reference coordinate system.

13. A system comprising:
    a plurality of robotic vehicles, wherein each robotic vehicle in the plurality of robotic vehicles is configured to move to a specific respective position for each robotic vehicle within an environment, wherein each robotic vehicle has a monument situated on a monument structure fixed to a base of the robotic vehicle, wherein the specific respective position for each robotic vehicle allows for calibration of the monument, wherein each robotic vehicle comprises a control unit configured to coordinate movement of the robotic vehicle with movement of the other robotic vehicles to identify the respective positions in the environment according to an optimization algorithm comprising a global cost function using least-square minimization according to: the number of robotic vehicles, a largest area in the environment within working range of the measurement system, and spatial orientation of the robotic vehicles to enable the direction-dependent sensors to point at the robotic vehicles;
    a measurement system in a number of measurement systems in the environment, the measurement system configured to interact with the monument of each of the robotic vehicles after each robotic vehicle has been positioned at its respective position to generate plurality of position measurements based on reference points provided by the monuments of the robotic vehicles within the environment; and a main controller configured to align the measurement system in the environment to a reference coordinate system based on the plurality of position measurements of the reference points, after which measurements can be generated by the measurement system for objects within the environments without need of the robotic vehicles.

14. The system of claim 13, wherein the measurement system is a laser tracking system configured to measure a position of an assembly in the environment, and a second measurement system is a position tracking system configured to measure a position of a part configured to be installed on the assembly.

15. The system of claim 14, wherein the main controller is further configured to identify a location of the part relative to the assembly using the reference coordinate system.

16. The system of claim 13 further comprising:
a second measurement system in the number of measurement systems in the environment, the second measurement system configured to interact with the monument of each of the robotic vehicles to generate a second plurality of position measurements based on the position of each of the robotic vehicles within the environment; and wherein the main controller is further configured to align the second measurement system in the environment to the reference coordinate system based on the second plurality of position measurements.

17. The system of claim 13, wherein each robotic vehicle has a sensor configured to generate sensor data used to determine when the robotic vehicle is at the position corresponding to the robotic vehicle, and wherein each robotic vehicle comprises a control unit configured to use the sensor data to track positions of other robotic vehicles in the plurality of robotic vehicles and to coordinate movement of the robotic vehicle with movement of the other robotic vehicles within the environment.

18. A system comprising:
a plurality of robotic vehicles configured to move into different respective positions in an environment, wherein each robotic vehicle comprises:
a base,
a monument structure removably associated with the base in which the monument structure is configured to support and hold a set of monuments and in which the monument structure comprises a positioning system configured to at least one of move a monument in the set of monuments in a direction toward or away from the base or rotate a monument in the set of monuments relative to the base, and
a movement system associated with the base and configured to move the robotic vehicle, wherein the movement system of each robotic vehicle comprises a control unit configured to coordinate movement of the robotic vehicle with movement of the other robotic vehicles to identify the respective positions in the environment according to an optimization algorithm comprising a global cost function using least-square minimization according to: the number of robotic vehicles, a largest area in the environment within working range of the measurement systems, and spatial orientation of the robotic vehicles to enable the direction-dependent sensors to point at the robotic vehicles;

a number of measurement systems in the environment, wherein each measurement system is configured to generate position measurements based on reference points provided by the monuments of the robotic vehicles after each robotic vehicle has been positioned at its respective position for use in aligning the number of measurement systems to a reference coordinate system; and a main controller configured to use the number of position measurements of the reference points generated by each of the number of measurement systems to align the number of measurement systems to the reference coordinate system, after which measurements can be generated by the measurement system for objects within the environments without need of the robotic vehicles.

19. The system of claim 18, wherein each robotic vehicle in the plurality of robotic vehicles further comprises:
a sensor system associated with the base and configured to generate sensor data; and
a control unit associated with the base and configured to receive the sensor data, wherein the control unit uses the sensor data to track positions of other robotic vehicles in the plurality of robotic vehicles and control the movement system to coordinate movement of the robotic vehicle with movement of the other robotic vehicles within the environment.

20. A method comprising:
attaching a monument to each robotic vehicle in a plurality of robotic vehicles;
tracking positions of other robotic vehicles in the plurality of robotic vehicles by each robotic vehicle;
coordinating movement of each robotic vehicle with movement of the other robotic vehicles within an environment by each robotic vehicle to move each robotic vehicle to a corresponding specific respective position for each robotic vehicle within the environment that allows for calibration of its monument, wherein coordinating movement of each robotic vehicle with movement of the other robotic vehicles to identify the respective positions in the environment is performed according to an optimization algorithm comprising a global cost function using least-square minimization according to: the number of robotic vehicles, a largest area in the environment within working range of the measurement systems, and spatial orientation of the robotic vehicles to enable the direction-dependent sensors to point at the robotic vehicles;
interacting a measurement system in a number of measurement systems in the environment with the monument of each robotic vehicle after each robotic vehicle has been positioned at its respective position to generate a plurality of position measurements based on reference points provided by the monuments of the robotic vehicles within the environment; and
aligning, via a main controller, the measurement system in the environment to a reference coordinate system based on the plurality of position measurements of the reference points, after which measurements can be generated by the measurement system for objects within the environments without need of the robotic vehicles.

21. The method of claim 20 further comprising:
transforming the plurality of position measurements generated by each measurement system in the number of measurement systems to the reference coordinate system for use in aligning the number of measurement systems to the reference coordinate system.

22. The method of claim 20 further comprising:
selecting the reference coordinate system from one of a coordinate system for a measurement system in the number of measurement systems and a coordinate system for the environment.

23. The method of claim 20, further comprising:
moving the robotic vehicle to a selectively located calibration position within the environment to calibrate the monument.

24. The method of claim 20, further comprising:
mounting a set of monuments on a monument structure on each robotic vehicle.

25. The method of claim 24 further comprising:
moving a monument in the set of monuments in a direction toward or away from a base of the robotic vehicle.

26. The method of claim 24 further comprising:
rotating a monument in the set of monuments relative to a base of the robotic vehicle.

27. The method of claim 24 further comprising:
removing the monument structure holding the set of monuments in the number of monuments on the robotic vehicle to at least one of add a monument to, remove a monument from, or replace a monument in the set of monuments mounted on the monument structure.

28. The method of claim 20 further comprising:
moving the plurality of robotic vehicles with the number of monuments out of the environment when the number of measurement systems have completed generating measurements for a number of objects on which operations are being performed within the environment.

29. A method for aligning a number of measurement systems to a reference coordinate system, the method comprising:
selecting the reference coordinate system from one of a coordinate system for a measurement system in the number of measurement systems and a coordinate system for a flexible manufacturing environment;
moving a plurality of robotic vehicles having a number of associated monuments, into a plurality of different respective positions within the flexible manufacturing environment that allow calibration of the monuments, wherein moving the plurality of robotic vehicles comprises tracking positions of other robotic vehicles in the plurality of robotic vehicles by each robotic vehicle in the plurality of robotic vehicles and coordinating movement of each robotic vehicle with movement of the other robotic vehicles within the flexible manufacturing environment by each robotic vehicle, wherein the respective positions within the flexible manufacturing environment are identified according to an optimization algorithm comprising a global cost function using least-square minimization according to: the number of robotic vehicles, a largest area in the environment within working range of the measurement systems, and spatial orientation of the robotic vehicles to enable the direction-dependent sensors to point at the robotic vehicles;
interacting the number of measurement systems with the monuments after each robotic vehicle has been positioned at its respective position to generate a plurality of position measurements based on reference points provided by the monuments of the plurality of robotic vehicles within the flexible manufacturing environment;
using the plurality of position measurements of the reference points to align the number of measurement systems to the reference coordinate system, after which measurements can be generated by the measurement system for objects within the environments without need of the robotic vehicles; and
moving the plurality of robotic vehicles out of the flexible manufacturing environment before the number of measurement systems generate measurements for a number of objects on which operations are being performed within the flexible manufacturing environment.

\* \* \* \* \*